US008075042B2

(12) United States Patent
Just

(10) Patent No.: US 8,075,042 B2
(45) Date of Patent: Dec. 13, 2011

(54) FOLDING TOP FOR A PASSENGER VEHICLE

(75) Inventor: Jan Just, Bloomfield Hills, MI (US)

(73) Assignee: Magna Car Top Systems GmbH, Bietigheim-Bissingen (DE)

(*) Notice: Subject to any disclaimer, the term of this patent is extended or adjusted under 35 U.S.C. 154(b) by 66 days.

(21) Appl. No.: 12/700,052

(22) Filed: Feb. 4, 2010

(65) Prior Publication Data

US 2010/0207424 A1 Aug. 19, 2010

(30) Foreign Application Priority Data

Feb. 19, 2009 (DE) ........................ 10 2009 009 722

(51) Int. Cl.
*B60J 7/00* (2006.01)

(52) U.S. Cl. ................................................ 296/107.01

(58) Field of Classification Search ............ 296/107.01, 296/108, 107.09
See application file for complete search history.

(56) References Cited

U.S. PATENT DOCUMENTS 2,329,802 A * 9/1943 Westrope ...................... 296/117
5,527,583 A 6/1996 Nozaki et al.
5,848,819 A 12/1998 Sautter, Jr.
5,998,948 A * 12/1999 Lange et al. .................. 296/122
6,270,143 B1 * 8/2001 Heselhaus et al. ....... 296/107.01
6,325,446 B1 * 12/2001 Wuellrich et al. ....... 296/107.12
6,460,920 B1 10/2002 Reinsch
6,464,284 B2 10/2002 Neubrand
6,637,802 B2 * 10/2003 Obendiek ..................... 296/108
6,692,061 B1 * 2/2004 Willard .................... 296/107.09
6,957,842 B1 * 10/2005 Garska ..................... 296/107.12
7,032,951 B2 * 4/2006 Powell ..................... 296/107.01
7,118,161 B2 * 10/2006 Neubrand ................ 296/107.15
7,275,783 B2 * 10/2007 Dilluvio ................... 296/107.09
7,334,831 B2 * 2/2008 Wezyk et al. ............ 296/107.09
2002/0084673 A1 7/2002 Neubrand
2006/0125282 A1 * 6/2006 Theuerkauf .............. 296/107.07

FOREIGN PATENT DOCUMENTS

DE 4303284 C1 6/1994
DE 4441667 C1 12/1995
DE 102007033121 A1 1/2009
EP 0276388 A1 8/1988
EP 0658455 A1 6/1995
EP 1078799 A2 8/2000

* cited by examiner

*Primary Examiner* — Kiran B. Patel
(74) *Attorney, Agent, or Firm* — Brooks Kushman P.C.

(57) ABSTRACT

A frame assembly of a folding top for a vehicle includes a front roof bow, a front support having a rear control arm, and a middle support having a front control arm. The rear end of the front support and the front end of the middle support face one another. The front roof bow and the front end of the front support are connected together through a first bolt connection. The rear end of the front support and the rear control arm are connected together through a second bolt connection. The front control arm and the front end of the middle support are connected together through a third bolt connection. The rear control arm and the front control arm are connected together at a joint such that the front support and the middle support are connected together.

13 Claims, 5 Drawing Sheets

35
44
33
43
28
30
32
48
36
68
71
38
49
16
14
24
67
69
66
39
12
70
42
40
41
27
65
A
A

FOLDING TOP FOR A PASSENGER VEHICLE

CROSS-REFERENCE TO RELATED APPLICATIONS

This application claims foreign priority benefits under 35 U.S.C. §119(a)-(d) to DE 10 2009 009 722.8, filed Feb. 19, 2009, which is hereby incorporated by reference in its entirety.

BACKGROUND OF THE INVENTION

1. Field of the Invention

The present invention relates to a convertible top frame assembly of a folding top for a vehicle.

2. Background Art

U.S. Pat. No. 5,848,819 describes a convertible top frame assembly having support elements lying one after the other on each longitudinal side of the assembly. Each support element includes a mounting rail configured to hold a seal for a door window. The ends of adjacent support elements face one another. These ends have control arm sections which are coupled together via a joint and are bolted in position on the corresponding support elements.

EP 0 276 388 B1 describes a convertible top frame assembly having a set of mounting rails on each longitudinal side of the assembly. The mounting rails are configured to hold seals. The mounting rails are fastened to joint parts by rivets. The seals are fixed to the mounting rails in a form-fit manner by tabs and cooperate with side windows through hose sections.

EP 0 658 455 B1 (corresponds to U.S. Pat. No. 5,527,583) describes a convertible top frame assembly having support structures on each longitudinal side of the assembly to hold seals on the body of a vehicle. The seals run along the longitudinal sides of the roof to seal door windows of the vehicle.

SUMMARY OF THE INVENTION

An object of the present invention is a convertible top frame assembly of a folding top for a vehicle in which the assembly is producible with reasonable expense to serve its intended purpose and minimizes the weight of the folding top while providing a relatively high amount of strength.

In carrying out the above object and other objects, the present invention provides a frame assembly of a folding top for a vehicle. The frame assembly includes a front roof bow, a front support element having a rear control arm section, and a middle support element having a front control arm section. The rear end of the front support element and the front end of the middle support element face one another. The front roof bow and the front end of the front support element are connected together through a first bolt connection. The rear end of the front support element and the rear control arm section are connected together through a second bolt connection. The front control arm section and the front end of the middle support element are connected together through a third bolt connection. The rear control arm section and the front control arm are connected together at a joint such that the front and middle support elements are connected together.

A convertible top frame assembly, or at least the front roof bow and the front support elements thereof, in accordance with embodiments of the present invention provides an exemplary assembly, i.e., an assembly made of multiple pieces but is nevertheless rigid and highly effective in combination with a folding top. The front roof bow, the support elements, and the control arm sections are components that are simple to design and realize. The front roof bow and the front support elements employ contact sections and spaced bolts to form an exemplary method of connection. The same also goes for the connection between the support elements with corresponding control arm sections. In one embodiment, the front roof bow and the support elements contribute to keeping down the weight by being formed of a light metal alloy. Each support element is in the form of a mounting rail having a multi-functional design. To this end, the mounting rail has a C-shaped receptacle section for receiving a tab section of a control arm section, e.g., in a form-fit manner. The mounting rail has another receptacle section for holding a seal. The way in which the front roof bow, the support elements, and the control arm sections are assembled together by an assembling device sets standards in convertible top technology through the structural design of the assembling device.

The above features, and other features and advantages of the present invention are readily apparent from the following detailed descriptions thereof when taken in connection with the accompanying drawings.

DETAILED DESCRIPTION OF THE PREFERRED EMBODIMENT(S)

Figure 1:
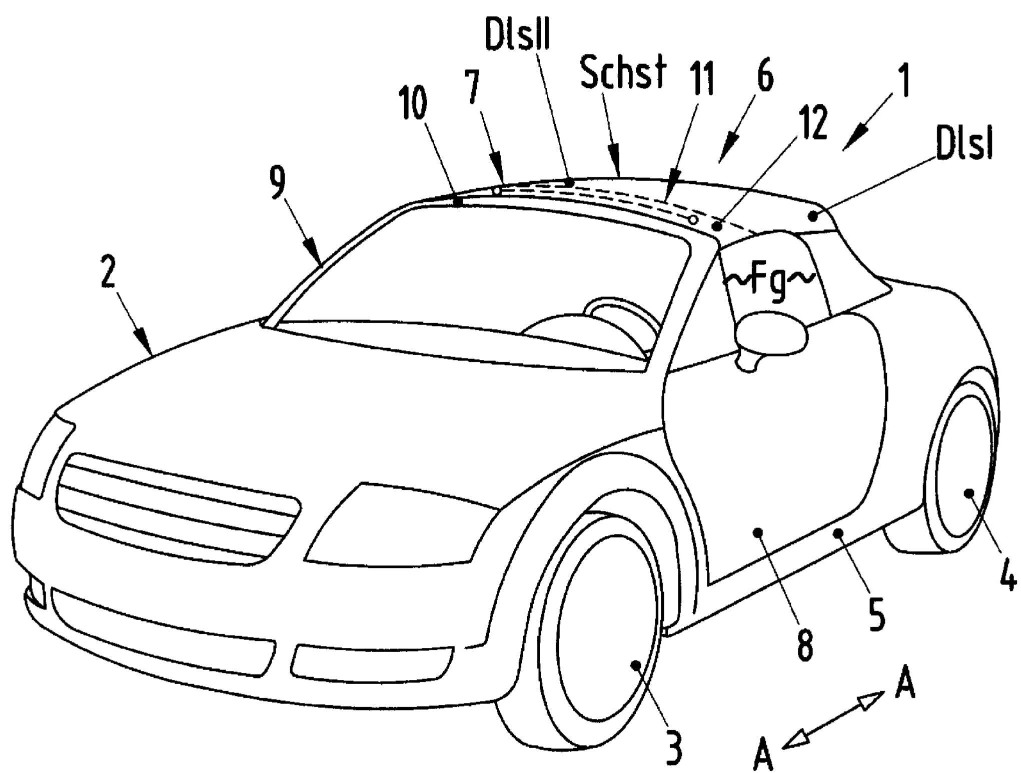
FIG. 1 illustrates a perspective view of a vehicle having a folding top in accordance with an embodiment of the present invention in which the folding top is in its closed position.

Referring now to FIG. 1, a perspective view of a passenger vehicle 1 having a folding top 7 in accordance with an embodiment of the present invention is shown. Vehicle 1 includes a vehicle body 2 having a base body 5 that is supported by two sets of wheels 3 and 4. Base body 5 holds side doors 8 and a windshield frame 9. Windshield frame 9 has an upper cross member 10.

Folding top 7 is a roof 6 movable between a closed position Schst and an opened position. In the closed position, folding top 7 extends over and covers a passenger compartment Fg of vehicle body 2. In the opened position, folding top 7 is rearwardly lowered into the trunk or the like of vehicle body 2 and stored therein. Folding top 7 is shown in FIG. 1 in its closed position.

Folding top 7 includes a convertible top frame assembly 14. Frame assembly 14 is pivotably attached to vehicle body 2 in a rear area 15 of folding top 7 (see FIG. 2) to move folding top 7 between the closed and opened positions. Folding top 7 further includes a cover 13 such as a top cloth. Cover 13 is stretched over frame assembly 14.

Folding top 7 further includes a front roof bow 12 in a front area of folding top 7. Front roof bow 12 extends transversely to vehicle longitudinal direction A-A between the longitudinal sides of vehicle body 2. Cover 13 is also stretched over front roof bow 12. Front roof bow 12 borders windshield frame 9 when folding top 7 is in the closed position. In this position, front roof bow 12 connects with cross member 10.

Figure 2:
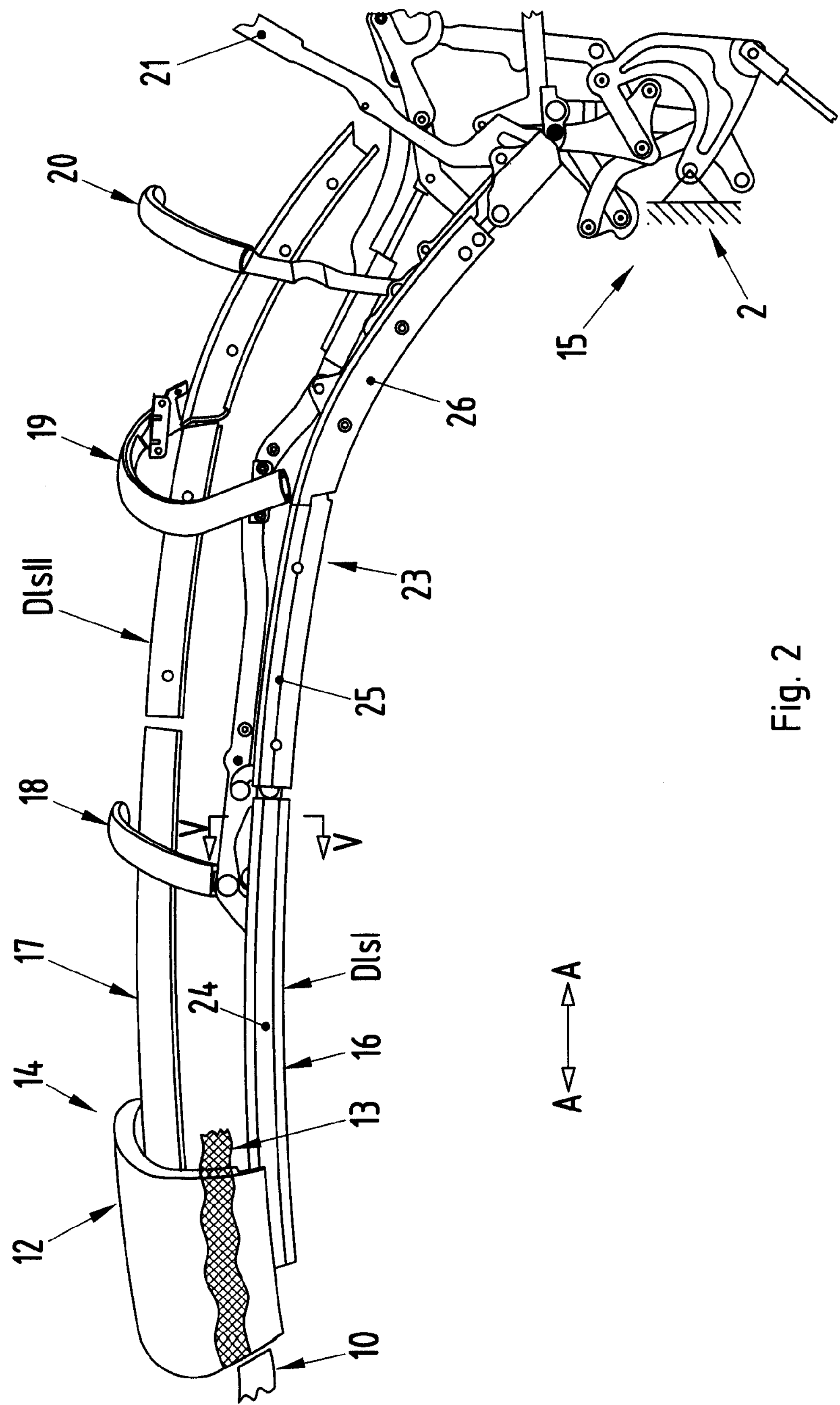
FIG. 2 illustrates a side view of the convertible top frame assembly of the folding top while the folding top is in its closed position.

Referring now to FIG. 2, with continual reference to FIG. 1, a side view of convertible top frame assembly 14 is shown. FIG. 2 illustrates frame assembly 14 while folding top 7 is in the closed position. Frame assembly 14 includes a first set of support elements 16 (namely, a front support element 24, a middle support element 25, and a rear support element 26). First support elements 16 lie on a first longitudinal side DlsI of frame assembly 14. In the closed position of folding top 7, first support elements 16 lie one after the other along the first longitudinal side DlsI. Similarly, frame assembly 14 includes a second set of support elements 17 (namely, a front support element, a middle support element, and a rear support element which are not labeled). Second support elements 17 lie on a second longitudinal side DlsII of frame assembly 14. In the closed position of folding top 7, second support elements 17 lie one after the other along the second longitudinal side DlsII. First and second longitudinal sides DlsI and DlsII of frame assembly 14 respectively correspond to the longitudinal sides of vehicle body 2.

First support elements 16 are laterally spaced apart from corresponding ones of second support elements 17 on the respective longitudinal sides DlsI, DlsII. For instance, front support element 24 of first support elements 16 and the front support element of second support elements 17 are laterally spaced apart from one another on the respective longitudinal sides DlsI, DlsII. Likewise, middle support element 25 of first support elements 16 and the middle support element of second support elements 17 are laterally spaced apart from one another on the respective longitudinal sides DlsI, DlsII. Support elements 16, 17 run at waist height in an arch 23 approximately from cross member 10 of windshield frame 9 to rear area 15 of folding top 7.

Each corresponding pair of support elements 16, 17 have the same configuration. For instance, front support element 24 of first support elements 16 and the front support element of second support elements 17 have the same configuration. Likewise, middle support element 25 of first support elements 16 and the middle support element of second support elements 17 have the same configuration. Similarly, both rear support elements have the same configuration.

Frame assembly 14 further includes a plurality of top bows 18, 19, 20, and 21. Top bows 18, 19, 20, and 21 extend transversely to vehicle longitudinal direction A-A between first support elements 16 and second support elements 17. A first end of each top bow 18, 19, 20, and 21 is connected to corresponding ones of first support elements 16. Likewise, a second end of each top bow 18, 19, 20, and 21 is connected to corresponding ones of second support elements 17.

As indicated above, each first support element 16 and each corresponding second support element 17 have the same configuration. As such, only first support elements 16 of longitudinal side DlsI will be described in further detail.

Figure 3:
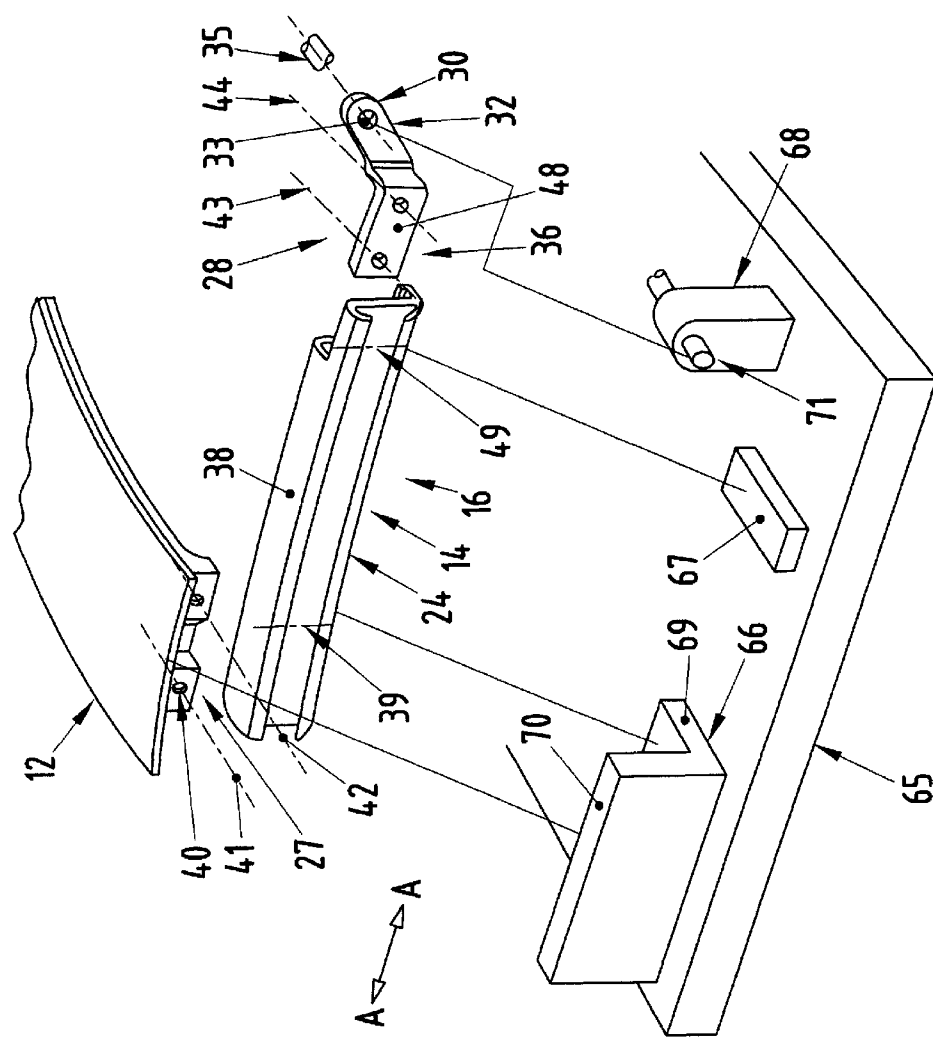
FIG. 3 illustrates (i) an exploded view of the front area of a first longitudinal side of the convertible top frame assembly including a front support element and its rear control arm section and (ii) a schematic view of an assembling device for assembling the front area of the folding top.
Figure 4:
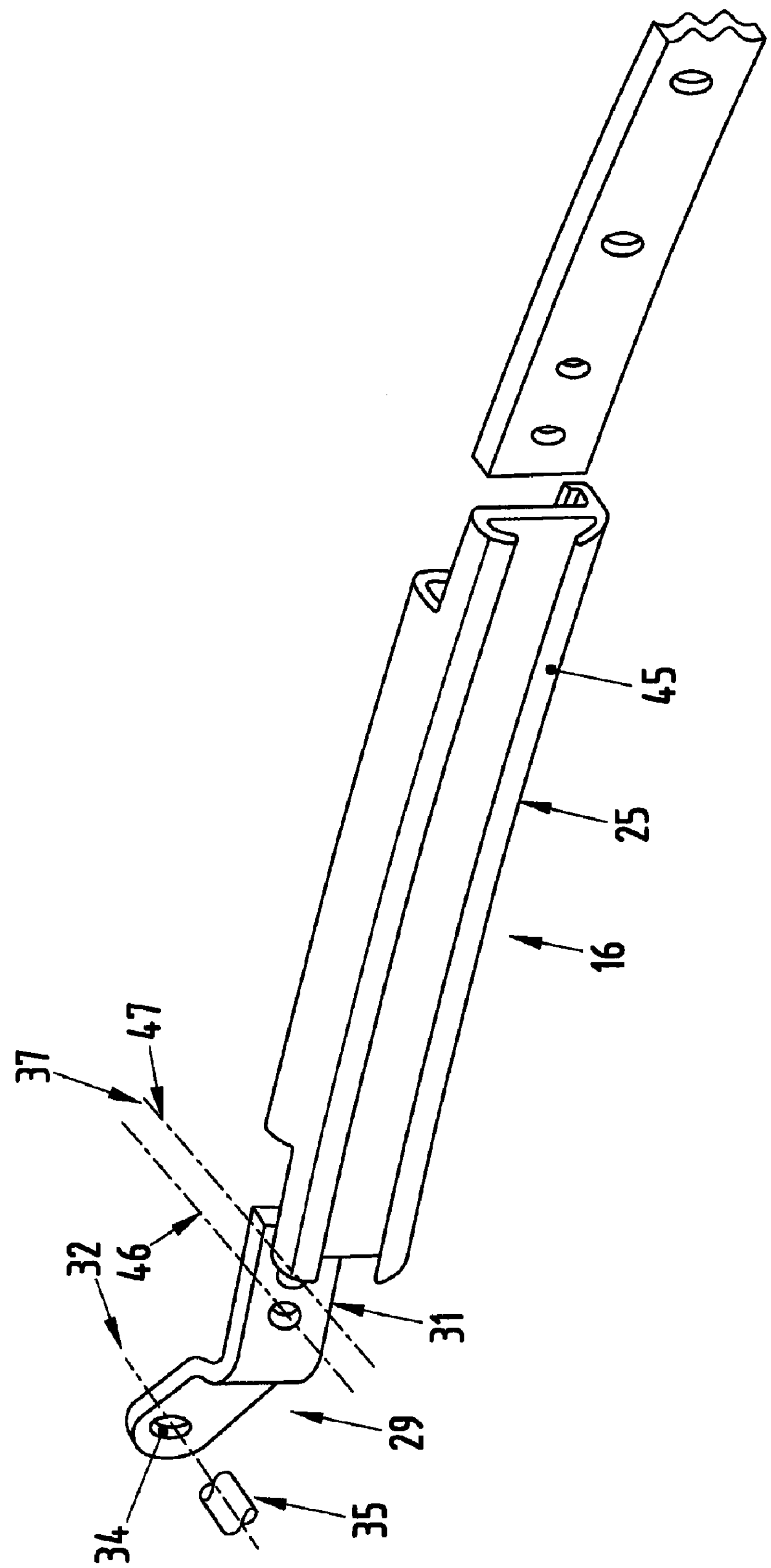
FIG. 4 illustrates an exploded view of the middle area of the first longitudinal side of the convertible top frame assembly including a middle support element and its front and rear control arm sections.

Referring now to FIGS. 3 and 4, with continual reference to FIG. 2, exploded views of the front area and the middle area of first longitudinal side DlsI of convertible top frame assembly 14 are shown. In particular, FIG. 3 illustrates the front area of the first longitudinal side DlsI of frame assembly 14 and FIG. 4 illustrates the middle area of the first longitudinal side DlsI of frame assembly 14.

Front support element 24 includes a front end (not labeled) and a rear end 28. The front end of front support element 24 connects with a first longitudinal side of front roof bow 12 via a bolt connection 27. Rear end 28 of front support element 24 includes a rear control arm section 30. Rear control arm section 30 is connected to rear end 28 of front support element 24 through a bolt connection 36.

Middle support element 25 includes a front end 29 and a rear end (not labeled). Front end 29 of middle support element 25 includes a front control arm section 31. Front control arm section 31 is connected to front end 29 of middle support element 25 through a bolt connection 37.

Rear end 28 of front support element 24 and front end 29 of middle support element 25 face one another. Rear control arm section 30 of front support element 24 and front control arm section 31 of middle support element 25 are coupled together and thereby couple front and middle support elements 24 and 25 together. Control arm sections 30 and 31 are coupled together through a joint 32. Joint 32 includes bearing holes 33 and 34. Bearing hole 33 is in rear control arm section 30 of front support element 24. Bearing hole 34 is in front control arm section 31 of middle support element 25. A joint bolt 35 extends through bearing holes 33, 34 of joint 32 to couple together control arm sections 30, 31 and thereby couple together front and middle support elements 24, 25.

Front support element 24, middle support element 25, and rear support element 26 are each designed as a type of mounting rail. Each mounting rail generally has the same configuration. As such, only first mounting rail 38 of front support element 24 will be described in further detail.

Front roof bow 12 is a flat component in the form of a flat top bow that extends in the vehicle's longitudinal direction A-A over part of the length of folding top 7. Front roof bow 12 and at least first mounting rail 38 (i.e., first support element 24) contribute to keeping the weight down by being formed from a light metal alloy (Al or Mg). In order to have the proper strength, rear control arm section 30 of front support element 24 and front control arm section 31 of middle support element 25 are formed from a ferrous metal alloy.

First mounting rail 38 of front support element 24 has a first contact section 39. As indicated above, the front end of front support element 24 connects with a first longitudinal side of front roof bow 12 via bolt connection 27. More particularly, first contact section 39 of first mounting rail 38 connects to a second contact section 40 of front roof bow 12 via bolt connection 27. The area of contact sections 39 and 40 is where bolt connection 27 is used. Bolt connection 27 includes two bolts 41 and 42 arranged at a distance from one another in the vehicle's longitudinal direction A-A.

Both of bolt connection 36 between rear control arm section 30 of front support element 24 (i.e., first mounting rail 38) and rear end 28 of front support element 24 and bolt connection 37 between front control arm section 31 of middle support element 25 (i.e., a second mounting rail 45) and front end 29 of middle support element 25 are comparable to bolt connection 27. For instance, bolt connection 36 includes two bolts 43 and 44 arranged at a distance from one another in the vehicle's longitudinal direction A-A. Likewise, bolt connection 37 includes two bolts 46 and 47 arranged at a distance from one another in the vehicle's longitudinal direction A-A.

Rear control arm section 30 of front support element 24 (i.e., first mounting rail 38) is a flat component with a rectangular upright cross section. Rear control arm section 30 has a first upright tab section 48. First tab section 48 is placed against a corresponding second upright tab section 49 of first mounting rail 38. Bolts 43 and 44 of bolt connection 36 penetrate tab sections 48 and 49.

Figure 5:
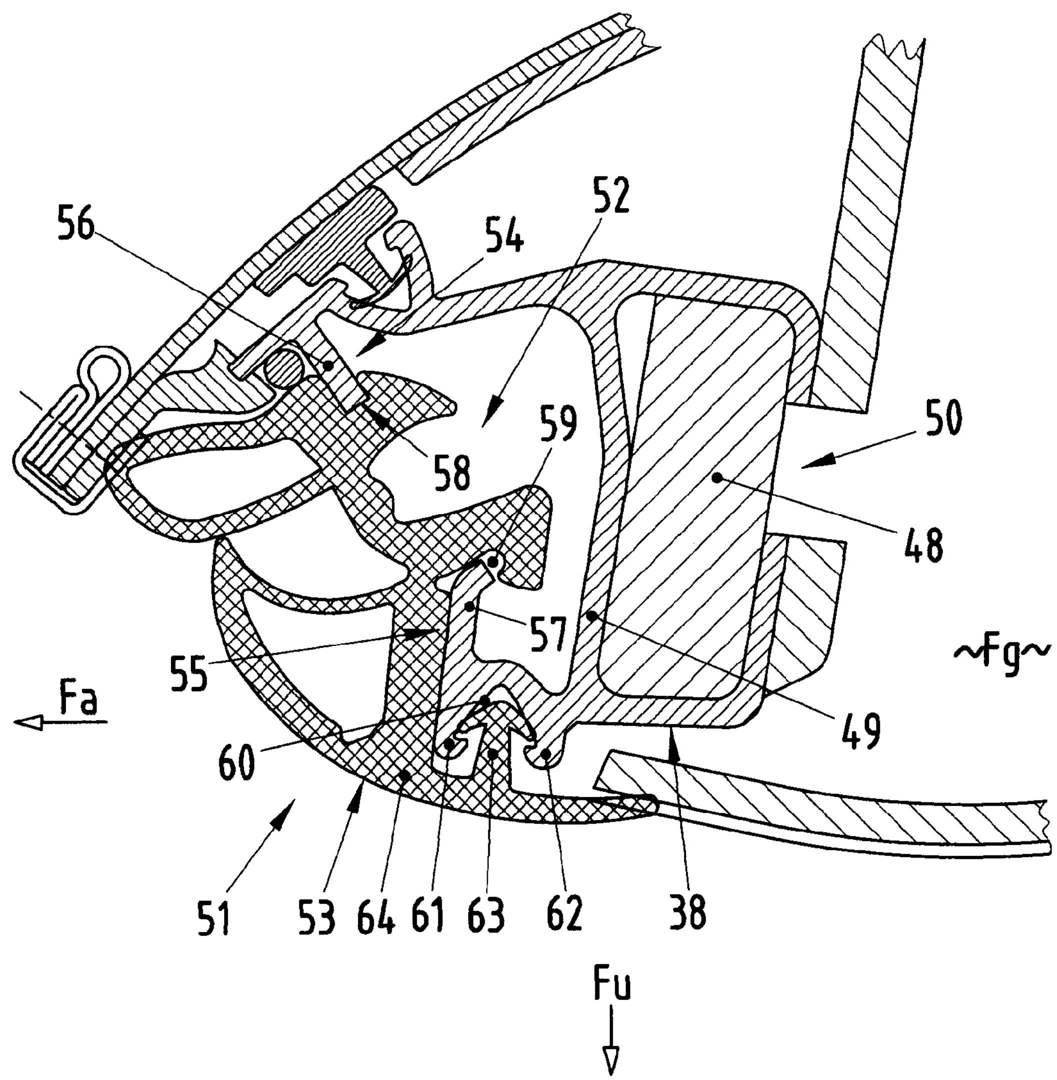
FIG. 5 illustrates a section of the convertible top frame assembly along the line V-V of FIG. 2.

Referring now to FIG. 5, with continual reference to FIGS. 2, 3, and 4, a section of convertible top frame assembly 14 along the line V-V of FIG. 2 is shown. Second tab section 49 of first mounting rail 38 is part of an approximately C-shaped first receptacle section 50 facing the passenger compartment Fg. First tab section 48 of rear control arm section 30 inserts into first receptacle section 50 of second tab section 49 such that first tab section 48 is held in a form-fit manner in first receptacle section 50.

On an area 51 facing the vehicle outside Fa, first mounting rail 38 has a second receptacle section 52 for a seal 53. Second receptacle section 52 has, on opposite sides 54 and 55, tabs 56 and 57. Tabs 56, 57 respectively engage into corresponding U-shaped recesses 58 and 59 of seal 53 and, in the process, fix seal 53 in place. An area of first mounting rail 38 facing the vehicle bottom Fu has a V-shaped recess 60 therein. V-shaped recess 60 has barbs 61 and 62 on opposite sections. A widened area 63 of a seal section 64 sits in recess 60 and reaches behind barbs 61 and 62 so as to fix seal section 64.

First mounting rail 38 with first receptacle section 50 and second receptacle section 52 is made in a single piece, which is done by extrusion molding or a comparable manufacturing process.

Referring now to FIG. 3, a schematic view of an assembling device 65 for assembling together the parts of folding top 7 such as front roof bow 12, front support element 24, and rear control arm section 30 of front support element 24 is shown. Assembling device 65 includes a first stop element 66 and a second stop element 67 for front support element 24. Assembling device 65 further includes a fixing element 68 for rear control arm section 30. First stop element 66 has an angular cross section with legs 69 and 70 against which front support element 24, and possibly front roof bow 12, come to rest. Fixing element 68 has a fixing pin 71 that orients bearing hole 33 of joint 32 of rear control arm section 30.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A frame assembly (14) of a folding top (7) for a vehicle (1), the frame assembly (14) comprising:
- a front roof bow (12);
- a front support (24) having a front end and a rear end (28);
- a middle support (25) having a front end (29);
- wherein the rear end (28) of the front support (24) and the front end (29) of the middle support (25) face one another;
- a rear control arm (30);
- a front control arm (31);
- wherein the front roof bow (12) and the front end of the front support (24) are connected together through a first bolt connection (27);
- wherein the rear end (28) of the front support (24) and the rear control arm (30) are connected together through a second bolt connection (36);
- wherein the front control arm (31) and the front end (29) of the middle support (25) are connected together through a third bolt connection (37);
- wherein the rear control arm (30) and the front control arm (31) are connected together at a joint (32) such that the front support (24) and the middle support (25) are connected together.

2. The frame assembly (14) of claim 1 wherein:
- the front support (24) is a front mounting rail (38) and the middle support (25) is a middle mounting rail (45).

3. The frame assembly (14) of claim 2 wherein:
- the first bolt connection (27) includes two bolts (41, 42) which are spaced apart longitudinally along the front end of the front support (24) and the front roof bow (12).

4. The frame assembly (14) of claim 3 wherein:
- the front end of the front support (24) has a first contact section (39);
- wherein the front roof bow (12) has a second contact section (40);
- wherein the first contact section (39) of the front end of the front support (24) and the second contact section (40) of the front roof bow (12) lie against one another with the two bolts (41, 42) of the first bolt connection (27) penetrating through the first and second contact sections (39, 40).

5. The frame assembly (14) claim 2 wherein:
- the second bolt connection (36) includes two bolts (43, 44) which are spaced apart longitudinally along the rear end (28) of the front support (24) and the rear control arm (30).

6. The frame assembly (14) of claim 5 wherein:
- the rear control arm (30) has a first upright tab section (48);
- wherein the rear end (28) of the front support (24) has a second upright tab section (49);
- wherein the first tab section (48) of the rear control arm (30) and the second tab section (49) of the rear end (28) of the front support (24) lie against one another with the two bolts (43, 44) of the second bolt connection (36) penetrating both the first and second tab sections (48, 49).

7. The frame assembly (14) of claim 6 wherein:
- the front support (24) further includes a C-shaped receptacle (50) configured to face a passenger compartment (Fg) of a vehicle (1);
- wherein the first tab section (48) of the rear control arm (30) is inserted into the C-shaped receptacle (50).

8. The frame assembly (14) of claim 7 wherein:
- the front support (24) further includes a second receptacle (52) configured to face the outside of a vehicle (1);
- the frame assembly (14) further comprising a seal (53);
- wherein the second receptacle (52) of the front support (24) holds the seal (53).

9. The frame assembly (14) of claim 8 wherein:
- the second receptacle (52) has first and second tabs (56, 57) that engage into corresponding recesses (58, 59) of the seal (53) to fix the seal to the second receptacle (52).

10. The frame assembly (14) of claim 9 wherein:
- the second receptacle (52) has a V-shaped recess (60) configured to face a bottom (Fu) of a vehicle (1), the V-shaped recess (60) having a pair of barbs (61, 62) receive a corresponding widened area (63) of a section (64) of the seal (53) that reaches behind the barbs (61, 62).

11. The frame assembly (14) of claim 8 wherein:
- the front support (24) with the C-shaped receptacle (50) and the second receptacle (52) is a single piece.

12. The frame assembly (14) of claim 11 wherein:
- the front support (24) is produced by extrusion molding.

13. The frame assembly (14) of claim 1 wherein:
- the front roof bow (12) and the front support (24) each include a light metal alloy;
- wherein the rear control arm (30) includes a steel alloy.

* * * * *